(12) United States Patent
Dinerstein et al.

(10) Patent No.: US 8,200,920 B2
(45) Date of Patent: Jun. 12, 2012

(54) SYSTEMS AND METHODS FOR STORING AND ACCESSING DATA STORED IN A DATA ARRAY

(75) Inventors: Joshua David Dinerstein, West Valley City, UT (US); John A. Aurich, South Jordan, UT (US); Kenneth Victor Steiner, Sandy, UT (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 723 days.

(21) Appl. No.: 12/350,902

(22) Filed: Jan. 8, 2009

(65) Prior Publication Data
US 2010/0174862 A1 Jul. 8, 2010

(51) Int. Cl.
*G06F 13/00* (2006.01)
(52) U.S. Cl. .. 711/158; 711/113; 711/170; 711/E12.001
(58) Field of Classification Search ........................ None
See application file for complete search history.

(56) References Cited

U.S. PATENT DOCUMENTS 6,076,089 A * 6/2000 Fischer et al. ........................ 1/1
2011/0099205 A1 * 4/2011 Shmueli et al. ............... 707/797

* cited by examiner

*Primary Examiner* — Hetul Patel
(74) *Attorney, Agent, or Firm* — Tarek N. Fahmi, APC

(57) ABSTRACT

Methods, systems, and apparatus for storing and accessing data stored in a data array are presented. In one embodiment, data is stored in a data array that includes a plurality of nodes. The nodes of the data array are segmented into one or more standard and priority pages. The pages are represented in a packed index. The priority pages are then cached and the standard pages are saved to disk. In another embodiment, data stored in a node of a data array may be accessed wherein the data array is segmented into at least one priority page and at least one standard page and the data array includes a plurality of nodes. A request for data stored in the node may be received. A priority page and/or a standard page may be searched for the node and, when found, the node may be accessed.

15 Claims, 4 Drawing Sheets

SYSTEMS AND METHODS FOR STORING AND ACCESSING DATA STORED IN A DATA ARRAY

FIELD OF THE INVENTION

The present invention relates to methods, systems, and apparatus for storing and accessing data stored in a data array.

BACKGROUND

A data array, or data structure, is a means of storing data in a computer system so that the data can be organized, accessed, and used. A fundamental unit of a typical data array is a node. Conventional nodes may store any amount of data, including another data array. The size of a node is typically determined by the designer of the data array.

Data arrays can have a variety of structures. One such structure is a binary tree. In a binary tree, nodes that store data are linked so that each node has only one parent and at most two children. In binary trees, nodes are typically arranged in horizontal rows called levels, such that, for example, a parent node is one level above its two children nodes. Binary search trees may be self-balancing so that the number of levels, or the tree's height, is kept as small as possible. Minimizing the height of the tree minimizes the number of nodes that are searched to find requested data. One such self-balancing binary tree is an AVL tree (so named for its inventors, G. M. Adelson-Velsky and E. M. Landis). Typically, AVL trees are stored in contiguous memory.

Data within a binary tree may be segmented into pages. A page is typically a block of main memory that contains the physical and virtual memory address of data or a data node. Pages are generally contiguous and are of uniform size.

As new data is added to a binary tree, the tree becomes larger and more complex, resulting in increased time and operating costs for storing and looking up data within a data tree. Even with its self-balancing feature, a binary tree can grow to a large size, making it difficult to store data, and search for data, within it.

SUMMARY OF THE INVENTION

Methods, systems, and apparatus for storing and accessing data stored in a data array are presented. In one embodiment consistent with the present invention, data is stored in a data array that includes a plurality of nodes. The nodes of the data array are segmented into pages in memory, for example one or more standard and priority pages, wherein a priority page includes priority data and a standard page includes non-priority data. The standard and priority pages are represented in a packed index. The priority pages are cached and the standard pages are saved to disk.

In some embodiments, a node may be analyzed to determine whether it contains priority data. If the node contains priority data, then it may be transferred to a priority page and the index may be updated to reflect such a transfer.

In some embodiments, the standard or priority pages are of a regular and consistent type and are small in size. Additionally or alternatively, a node may be stored on only one page of the data array and the data array may be an AVL tree.

Further embodiments of the invention provide for allocating a top portion of the packed index information for a page to represent the page number of the page in the array and allocating a bottom portion of the packed index information for the page to represent an immediate index within the page. In some cases, the first bit of the packed index information for a page is allocated to indicate that the page is a priority page.

In one embodiment, the nodes in a top portion of the data array are included in a priority page. In some cases, the array includes a plurality of priority pages.

In still further embodiments, a first priority page includes a first set of layers of the data array, a second priority page includes a second set of layers of the data array and a third and fourth priority page include a third set of layers of the data array. Additionally or alternatively, data in a node located in a priority page may be analyzed to determine whether it is still priority data. When the data is no longer a priority, it may be transferred to a standard page and the packed index updated. Likewise, data in a node located in a standard page may be analyzed to determine whether it is priority data. When the data is priority data, it may be transferred to a priority page and the packed index updated.

In a still further embodiment, data stored in a node of a data array may be accessed, wherein the data array is segmented into at least one priority page and at least one standard page and the data array includes a plurality of nodes. A request for data stored in the node may be received. A priority page and then a standard page may be searched for the node and, when found, the node may be accessed. In some cases the packed index may be used to locate a page or node containing the required data, or the required data itself.

Other aspects of the present invention will be apparent from the accompanying figures and from the detailed description that follows.

BRIEF DESCRIPTION OF THE DRAWINGS

The present invention is illustrated by way of example, and not limitation, in the figures of the accompanying drawings in which.

DETAILED DESCRIPTION

Recognizing the shortcomings of conventional data arrays in general and AVL data arrays in particular, the present inventors have developed methods, systems, and apparatus for storing and accessing data stored in a data array. In some embodiments, data may be stored in a data array that includes a plurality of nodes. The nodes of the data array may be segmented into one or more standard and/or priority pages. A priority page may contain priority data while a standard page may contain non-priority or archived data. The standard and/or priority pages may be represented in a packed index. Priority pages may be cached in a data storage system and standard pages may be saved to disk in a data storage system.

In another embodiment, data stored in a node of a data array may be accessed. The data array may be segmented into at least one priority page and at least one standard page and the data array may include a plurality of nodes. A request for data stored in the node may be received. A priority page and/or a standard page may be searched for the node and, when found, the node may be accessed. Accordingly, methods, systems, and apparatus for storing and accessing data stored in a data array are described below.

Figure 1:
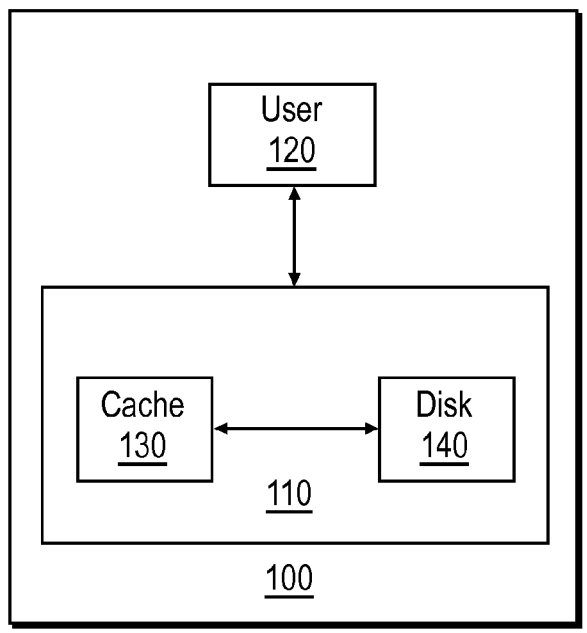
FIG. 1 illustrates an exemplary block diagram of a system for accessing data, consistent with some embodiments of the present invention.

FIG. 1 illustrates a block diagram of a system 100 for accessing data. System 100 includes a data storage device 110 accessible by a user 120 and has a cache 130 coupled to a disk 140. Data storage device 110 may be any appropriate device for storing data, such as a computer memory. User 120 may be, for example, a human user or computerized client. Cache 130 may be any conventional device for caching data such as random access memory (RAM) or a disk cache. Disk 140 may be any conventional device for storing data such as a hard disk drive or a flash drive. Communication between the components of system 100 may be provided by any appropriate means for facilitating communication between user 120, data storage device 110, cache 130, and/or disk 140, such as wired or wireless communications links.

Figure 2:
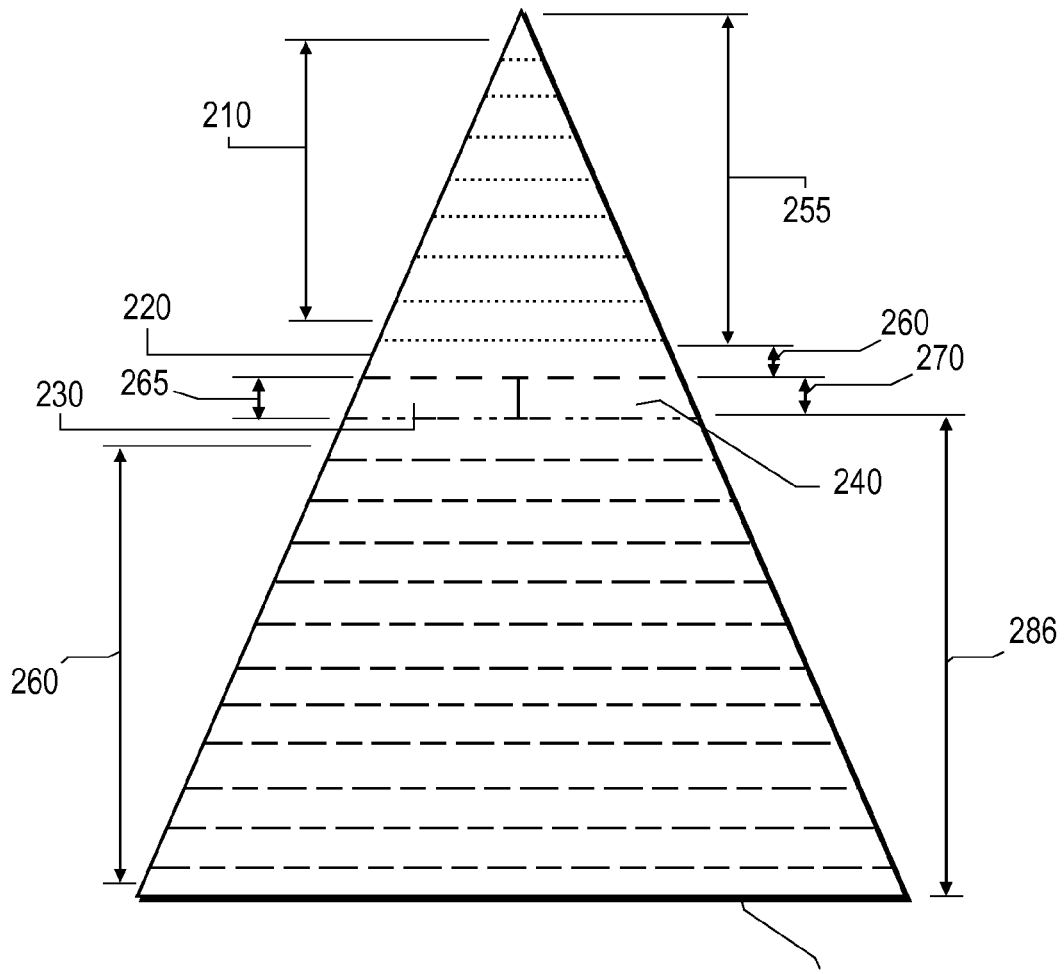
FIG. 2 illustrates an exemplary block diagram of a segmented data array, consistent with some embodiments of the present invention.

FIG. 2 illustrates an exemplary block diagram of a segmented data array 200 including a first set of levels 210, a second set of levels 220, a third set of levels 230, a fourth set of levels 240, a fifth set of levels 250, a first priority page 255, a second priority page 260, a third priority page 265, a fourth priority page 270, and a set of standard pages 280. A priority page may contain nodes that are of a high priority to a user, such as user 120. High priority nodes may be, for example, nodes that are used frequently or recently, or nodes that must be immediately accessible to a user. A standard page may contain nodes that are not a priority for a user, such as user 120. Standard nodes may be, for example, nodes that are not frequently or recently accessed, or nodes that contain archived data.

Data array 200 may be stored in a data storage device, such as data storage device 110 and may be accessed by a user, such as user 120. A layer may be a horizontal row of nodes in a data array. The dashed lines of FIG. 2 represent layers of data array 200. First set of levels 210 may include, for example, the first eight (8) levels of data array 200, and may be included in first priority page 255. Second set of levels 220 may include, for example, the ninth level of data array 200, and may be included in second priority page 260. Third set of levels 230 and fourth set of levels 240 may include, for example, the tenth level of data array 200, and may be divided into two priority pages, such as third and fourth priority pages 265 and 270, respectively. The remaining levels of the data array may be included in the set of standard pages 280.

Figure 3:
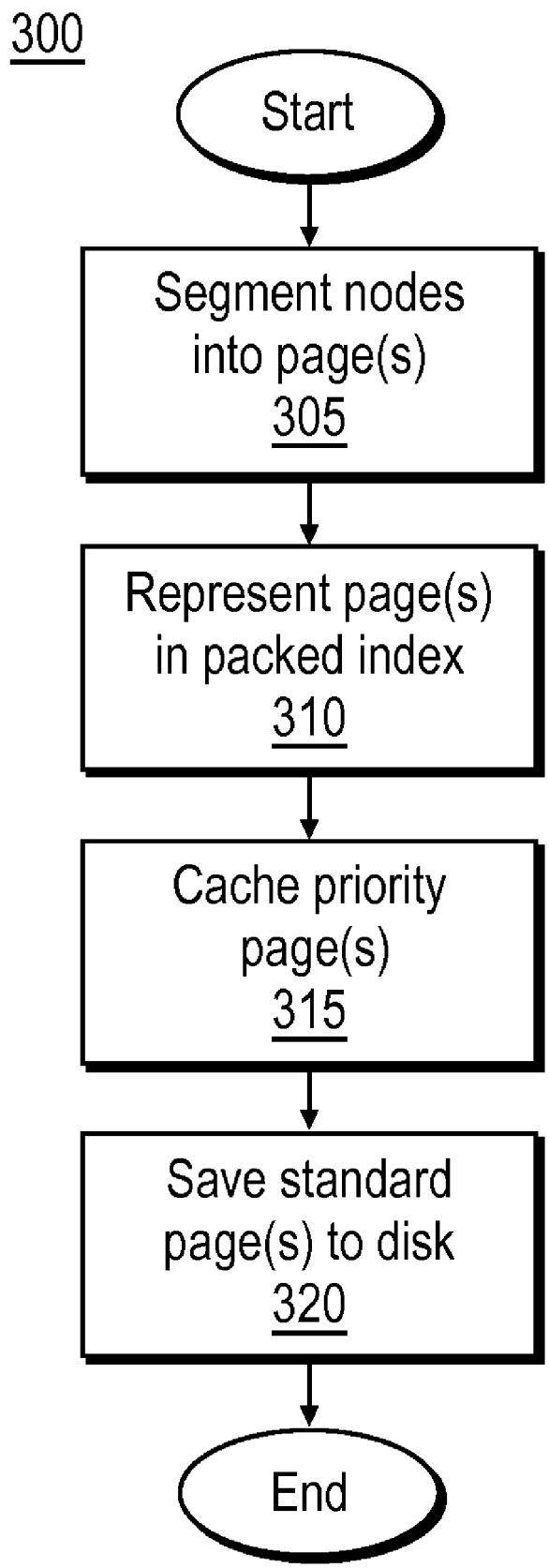
FIG. 3 illustrates an exemplary process for segmenting data nodes of a data array into pages, consistent with some embodiments of the present invention.

FIG. 3 illustrates an exemplary process 300 for segmenting data nodes of a data array, such as data array 200 into pages. Process 300 may be performed using system 100. The data array may be a relational data base, a binary tree, a self-balancing binary search tree, or an AVL tree. The data stored in the array may be log data for a data storage device, like data storage device 110. The data array may include a plurality of nodes. Exemplary nodes may contain data, and/or may represent a separate data structure.

Conventional data arrays must be contiguously stored in the finite memory of a data storage device. As a data array grows in size it becomes increasingly difficult to find enough contiguous storage space for it in the memory available in the data storage device. Process 300 may be used to divide a contiguous data array into smaller segments called pages. One advantage of segmenting a data array into pages is that pages may not require contiguous storage with each other such that the pages of a data array may be stored in available non-contiguous portions of memory instead in a contiguous block of memory. Thus, segmenting the data array into smaller pages allows for easier and more efficient storage of the data array in a data storage device. Consequently the capacity of the data storage device (and, in some cases, such as when page swapping is used, the speed with which data within the data storage device is accessed) is increased by the implementation of process 300.

In step 305, the array may be segmented into one or more pages. This segmentation may be accomplished by repeatedly obtaining an available page from the data storage device and populating that page, sequentially, with the next set of nodes of the data array 200. A page may be small in size, including, for example, 256 nodes, and may be of a regular, consistent size. The pages of the array may be, for example, priority or standard pages. The size of the page may be dependent on the type of page, for example a standard or priority page. Pages of an array may not be contiguously stored and nodes may be stored in only one page at a time.

Once segmented, the one or more pages may be represented in a packed index (step 310). The packed index information for a page may indicate the location of the page within a data array, such as data array 200, and may include, for example, the page number of the page and/or an immediate index of the contents of the page. The index information for a page may indicate whether the page is a priority page or a standard page. Such indexing helps to quickly identify the proper page and the node on that page. For example, for an n-bit index, the top y-bits (y<n) of the index information for a page may represent the page number of a page within the data array and the first m-bits (m<y, e.g., m=1) may indicate whether the page is a priority or standard page. The remaining z-bits (z=n−y) may represent an immediate index within the page. The immediate index within the page may reference one or more nodes included in the page.

In step 315, the one or more priority pages may be cached in a caching device, such as cache 130. The one or more standard pages may be saved on a disk, such as disk 140 (step 320) and process 300 may end. The storing of priority pages to a cache and standard pages to disk is a unique feature of the present invention. By only storing a small portion (the priority pages) of what may be a very large data array in memory (e.g., in a cache portion of memory), savings in terms of the overall use of memory are realized. That is, the memory is used only to store prioritized nodes. Other nodes (which in some cases may be accessed less often) may be stored to disk and so do not take up valuable memory space. At the same time, by storing prioritized nodes in memory, the time taken to retrieve information from those nodes is reduced from that which would be the case if the entire data array were stored on disk. As will be discussed below, when searching for data, the prioritized nodes (stored in memory) may be searched quickly. If the subject node having the requested data is not found, the search may proceed to the standard pages of the data array which are stored on disk. The information stored in the standard pages may be that which is least recently used by system 100. The present invention thus allows for multiple, very large AVL trees and/or other data arrays to be stored in an efficient manner that consumes only a minimal amount of memory space. Such arrays will not interfere with one another inasmuch as it is not necessary to store one array to disk in order to read another into memory when performing a search. Instead, each can be allocated a portion of memory (the cache) for its respective prioritized information.

The nature of AVL trees are such that they may need to rebalance themselves after each add/delete/change operation. Depending on the current configuration of the tree, this may mean moving nodes or not. When rebalancing occurs it also affects the priority pages of a data array and what is considered priority data. It is possible for a former priority node to no longer be considered a priority and be transferred to a standard page. Hence, system 100 includes a procedure for performing such activities. These procedures may be performed by a processor having access to the data storage device 110.

Figure 4:
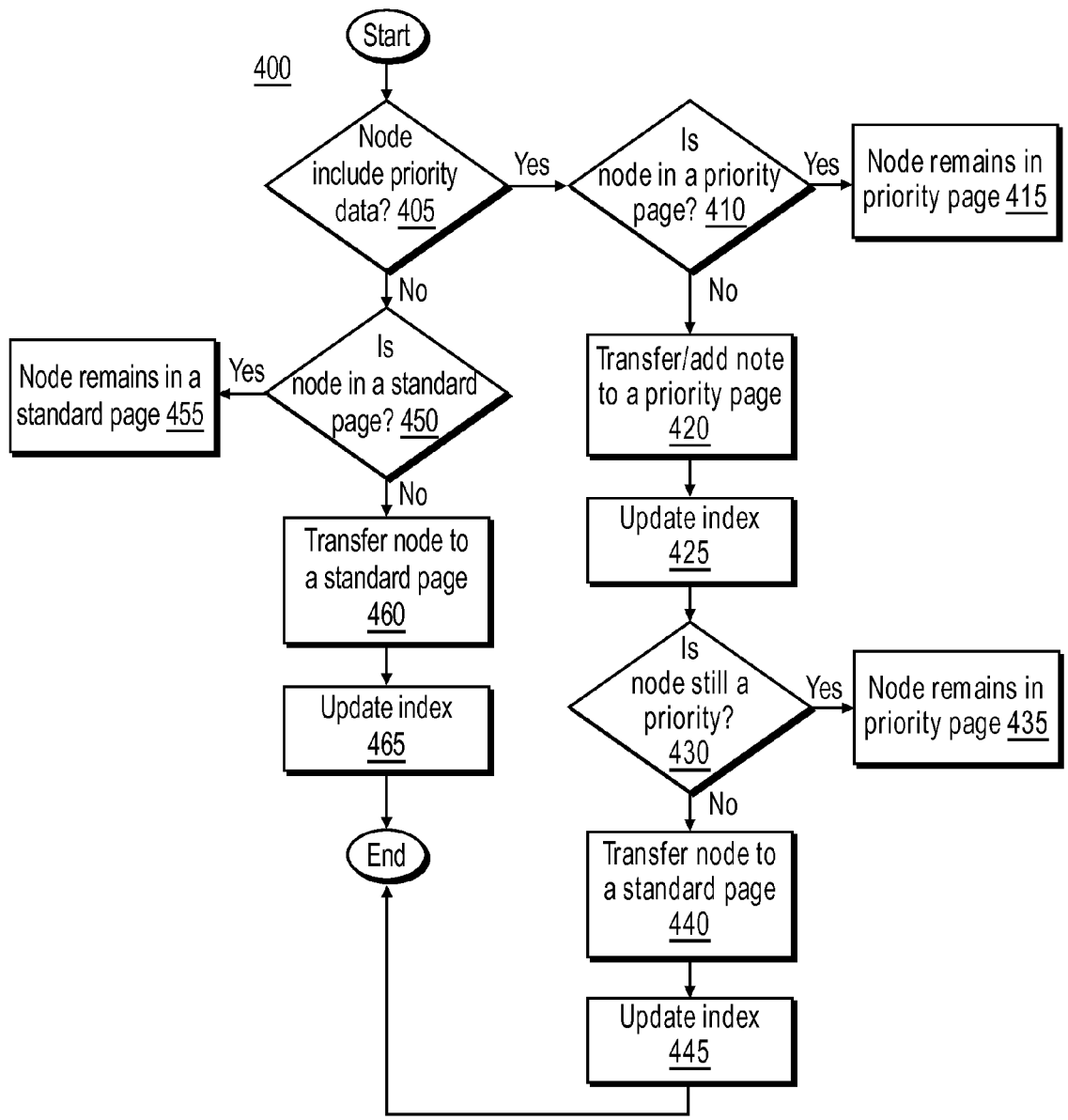
FIG. 4 illustrates an exemplary process for determining whether a node should be included in a priority page, consistent with some embodiments of the present invention.

FIG. 4 illustrates an exemplary process 400 for determining whether a node in a data array should be included in a priority page. Such a determination may, for example, increase user accessibility to a node, increase the efficiency of searching for data stored in a node of the data array, and/or decrease the access time for a node. Process 400 may be performed using system 100. In step 405, it is determined whether a node in a data array, such as data array 200, includes priority data. The node may be a node in a data array, such as data array 200, or may be a new node to be added to the array.

Exemplary nodes may contain data, or may represent a separate data structure. When a node contains priority data, its location may be analyzed to determine whether it is located in a priority page (step 410). If the node is located in a priority page, then it may remain in the priority page (step 415). If the node is not located in a priority page, then it may be transferred and/or added to a priority page, as in step 420. In step 425, an index of the nodes in the data array may then be updated to show the new location of the node. The index may be a packed index.

In step 430, a node may be evaluated to determine whether it is still a priority. Such evaluations may be performed, for example, periodically or on an as needed basis. If the node is still a priority it may remain in its priority page, or may be transferred to another priority page, as in step 435. In step 440, when a node is no longer a priority, it may be transferred to a standard page. When a node is transferred to a standard page, the index may be updated to reflect such a transfer, as in step 445, and process 400 may end.

If a node is not a priority, then it may be determined whether the node is in a standard page, as in step 450. If the node is located in a standard page, then it may remain in the standard page (step 455). If the node is not located in a priority page, then it may be transferred and/or added to a standard page, as in step 460. In step 465, an index may then be updated to show the new location of the node and process 400 may end. The index may be a packed index.

System 100 is also configured to permit access to the data stored in a data array. For example, user 120 may require such access. Recall that user 120 may be a computer client; hence, the following procedures may be performed by an appropriately configured processor (e.g., one acting under program control) that has access to the data storage device 110.

Figure 5:
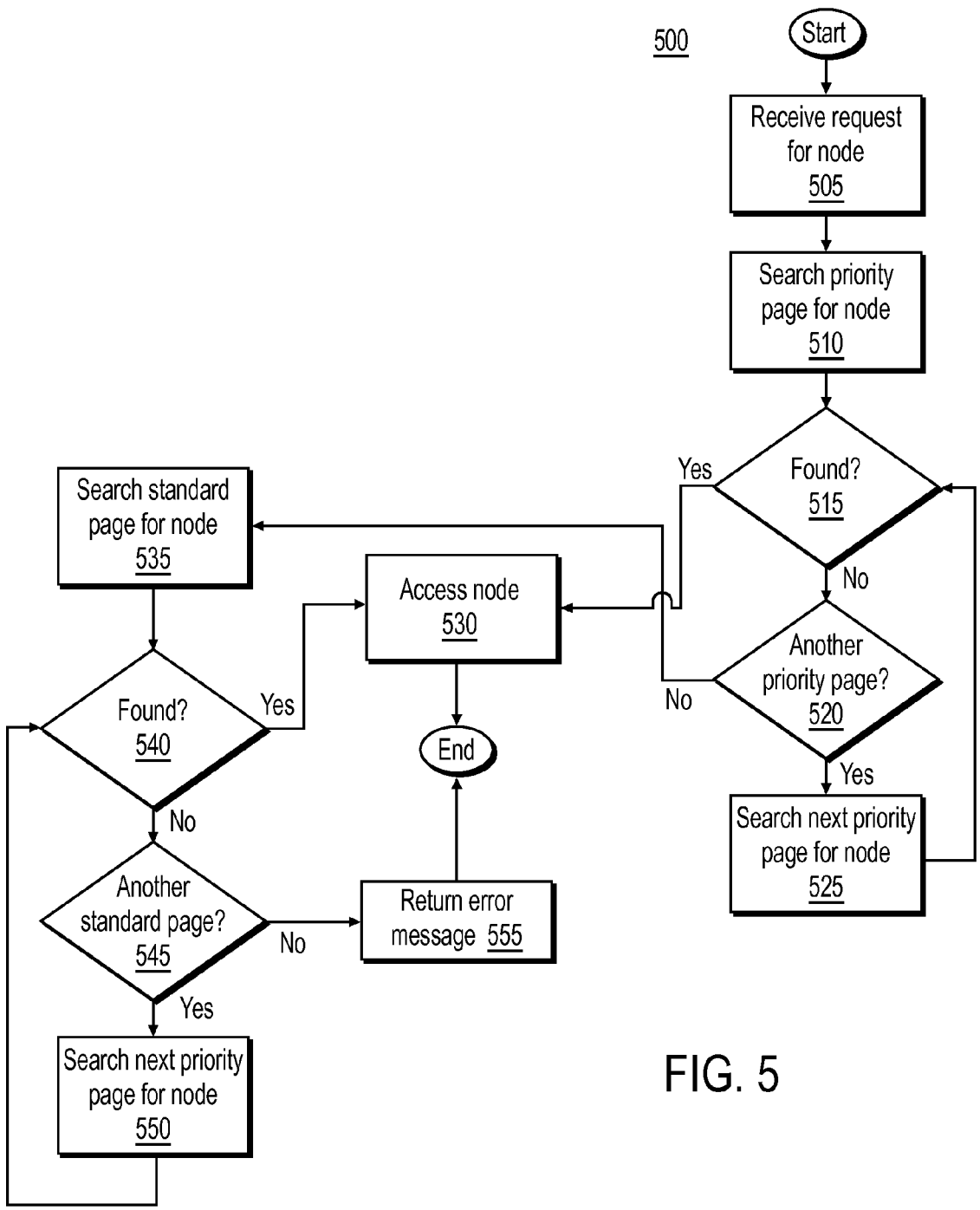
FIG. 5 illustrates an exemplary process for accessing data, consistent with some embodiments of the present invention.

FIG. 5 illustrates an exemplary process 500 for accessing data stored in a node of a data array, such as data array 200. The data array may include a plurality of nodes and may be segmented into one or more priority and/or standard pages. The node may be a node in a data array or may be a new node to be added to the array. Process 500 may be performed using system 100. In step 505, a request for data stored in a node of a data array is received. The request may be sent by, for example, a client or user, such as user 120. The request may be received by a data storage device, such as data storage device 110. The data array may then be searched for the requested node. The priority pages may be searched first, and may be searched such that the first priority page is searched first, followed by the second priority page, and so on.

In step 510, a search of a priority page for the requested node is conducted. When the requested node is found, as in step 515, the node may be accessed, as in step 530, and process 500 may end. If the data is not found, then it may be determined whether another priority page is available to be searched, as in step 520. If there is another priority page to be searched, it may be searched for the requested node, as in step 525 and part of process 500 may repeat itself. The priority page searched in step 525 may be, for example, the next available priority page.

If there is not another available priority page, then a standard page may be searched, as in step 535. If the node is found, as in step 540, then the node may be accessed as in step 530 and process 500 may end. If the node is not found, it is determined whether there is another standard page available to search, as in step 545. In step 550, the next available standard page may be searched. If there is not another available standard page then the requested data may not be found and an error message may be returned to the user (step 555) and process 500 may end.

Thus, methods and systems for storing and accessing data stored in a data array have been presented herein. The details of these methods and systems set forth above and in the accompanying figures have been presented for purposes of explanation, but the present invention should only be measured in terms of the following claims.

What is claimed is:

1. A method of storing data in a data array, wherein the data array includes a plurality of nodes, the method comprising:
   segmenting the nodes of the data array into one or more standard and priority pages, wherein a priority page includes priority data;
   representing the one or more standard and priority pages in a packed index, wherein a first bit of the packed index information for a page is allocated to indicate that the page is a priority page;
   caching the one or more priority pages; and
   saving the one or more standard pages to a disk.

2. The method of claim 1, further comprising:
   determining whether a node includes priority data;
   transferring the node into a priority page based on the determination; and
   updating the packed index to show that the node is in the priority page.

3. The method of claim 1, wherein the data stored is log data.

4. The method of claim 1, wherein the one or more standard or priority pages are of a regular and consistent type and are small in size.

5. The method of claim 1, wherein a node is stored on only one page of the data array.

6. The method of claim 1, wherein the data array is an AVL tree.

7. The method of claim 1, further comprising:
   allocating a top portion of the packed index information for a page to represent the page number of the page in the array; and
   allocating a bottom portion of the packed index information for the page to represent an immediate index within the page.

8. The method of claim 1, further comprising:
   including the nodes in a top portion of the data array in a priority page.

9. The method of claim 1, wherein the data array includes a plurality of priority pages.

10. The method of claim 1, further comprising:
    representing, with a first priority page, a first set of layers of the data array;
    representing, with a second priority page, a second set of layers of the data array; and representing, with a third and fourth priority page, a third set of layers of the data array.

11. The method of claim 1, further comprising:
periodically determining whether the data in a node located in a priority page is still priority data;
transferring the node from the priority page to a standard page, based upon a determination that the data is not priority data; and
updating the packed index to show that the node is in a standard page.

12. The method of claim 1, further comprising:
periodically determining whether the data in a node located in a standard page is priority data;
transferring the node from the standard page to a priority page, based upon a determination that the data is priority data; and
updating the packed index to show that the node is in a priority page.

13. The method of claim 1, wherein the data node is a new or existing node.

14. A system for storing data in a data array, wherein the data array includes a plurality of nodes, the system comprising:
a data storage system for segmenting the nodes of the data array into one or more standard and priority pages, wherein a priority page includes priority data;
a packed index for representing the one or more standard and priority pages, wherein a first bit of the packed index information for a page is allocated to indicate that the page is a priority page;
a cache for caching the one or more priority pages; and
a disk for saving the one or more standard pages.

15. An apparatus for storing data in a data array, wherein the data array includes a plurality of nodes, the apparatus comprising:
a data storage system for segmenting the nodes of the data array into one or more standard and priority pages, wherein a priority page includes priority data;
a packed index for representing the one or more standard and priority pages, wherein a first bit of the packed index information for a page is allocated to indicate that the page is a priority page;
a cache for caching the one or more priority pages; and
a disk for saving the one or more standard pages.

* * * * *